United States Patent

[11] 3,593,651

| [72] | Inventor | Helen E. McEvoy<br>1416 W. Douglas Ave., Wichita, Kans. 67213 |
|---|---|---|
| [21] | Appl. No. | 840,904 |
| [22] | Filed | July 11, 1969 |
| [45] | Patented | July 20, 1971 |

[54] COMBINATION COOKER, FRYER AND BUN WARMER ELECTRICAL APPLIANCE
5 Claims, 5 Drawing Figs.

[52] U.S. Cl............................................... 99/339,
99/403, 219/430, 219/439, 219/441, 219/472
[51] Int. Cl............................................... A47j 27/18
[50] Field of Search......................................... 219/385-
—6, 430—39, 472—4, 441, 521; 99/339, 403,
422; 126/273

[56] References Cited
UNITED STATES PATENTS

| 1,991,906 | 2/1935 | McEvoy | 99/339 |
| 2,205,160 | 6/1940 | Trackwell | 99/339 |
| 2,715,898 | 8/1955 | Michaelis et al. | 126/273 |
| 2,737,881 | 3/1956 | Turner | 99/339 |
| 3,231,718 | 1/1966 | Vasile | 219/385 X |
| 3,456,578 | 7/1969 | Pinsly | 99/399 |

*Primary Examiner*—Volodymyr Y. Mayewsky
*Attorney*—Robert E. Breidenthal

ABSTRACT: Electrical food preparation apparatus comprising an open-topped cooking container recessed in the top of a housing with free airspace within the housing below and about the sides of the container. The container has a sloping bottom and independent thermostatically controlled electric heaters are disposed below the relatively upper and lower portions so as to heat controllably such respective portions and to heat the airspace for heat transfer to the top of the housing. Valve-controlled means are provided for introducing water into the container, and means are provided for reducing heat transfer to portions of the housing as well as means for protecting the user against inadvertent contact with the housing.

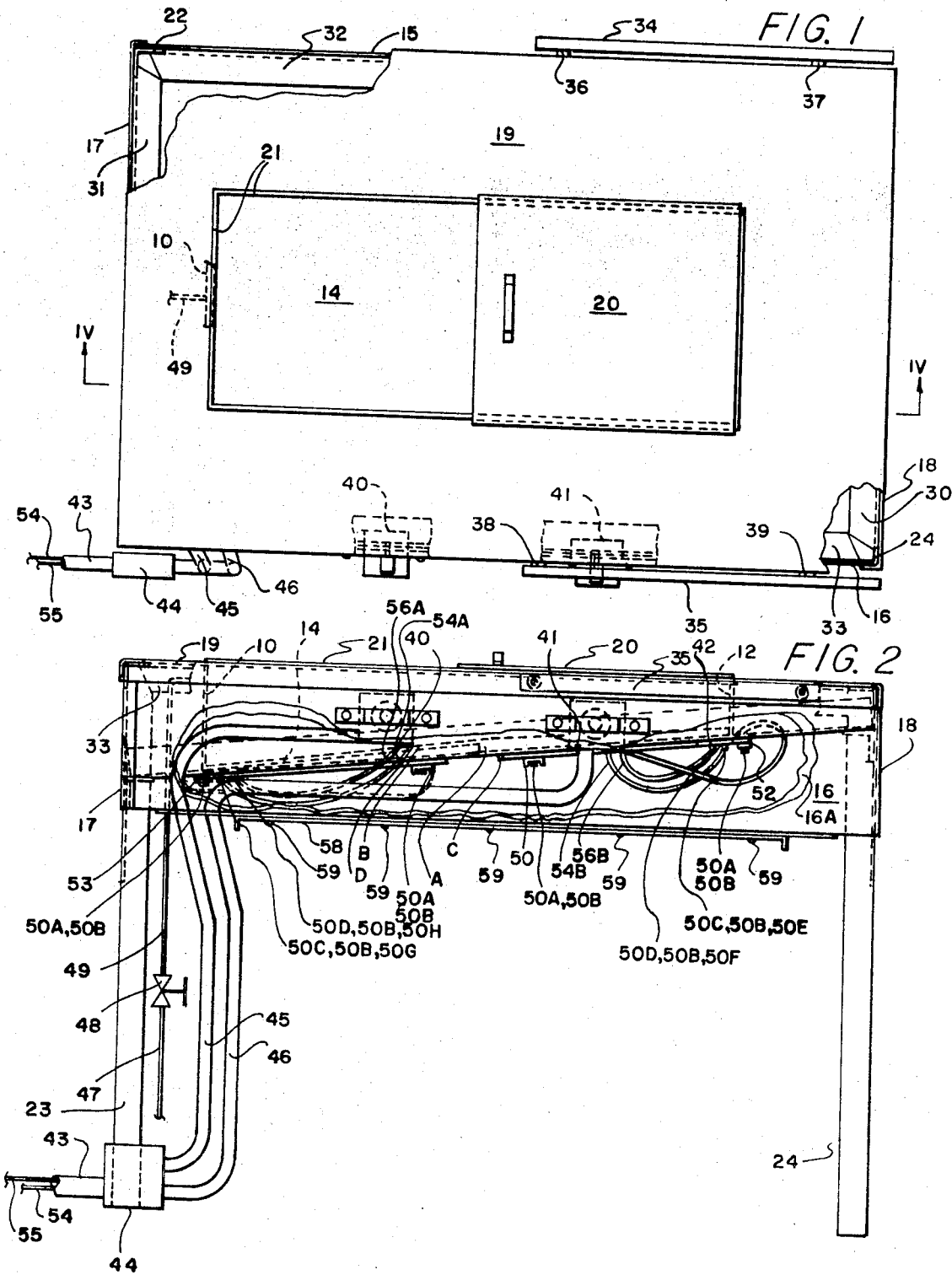

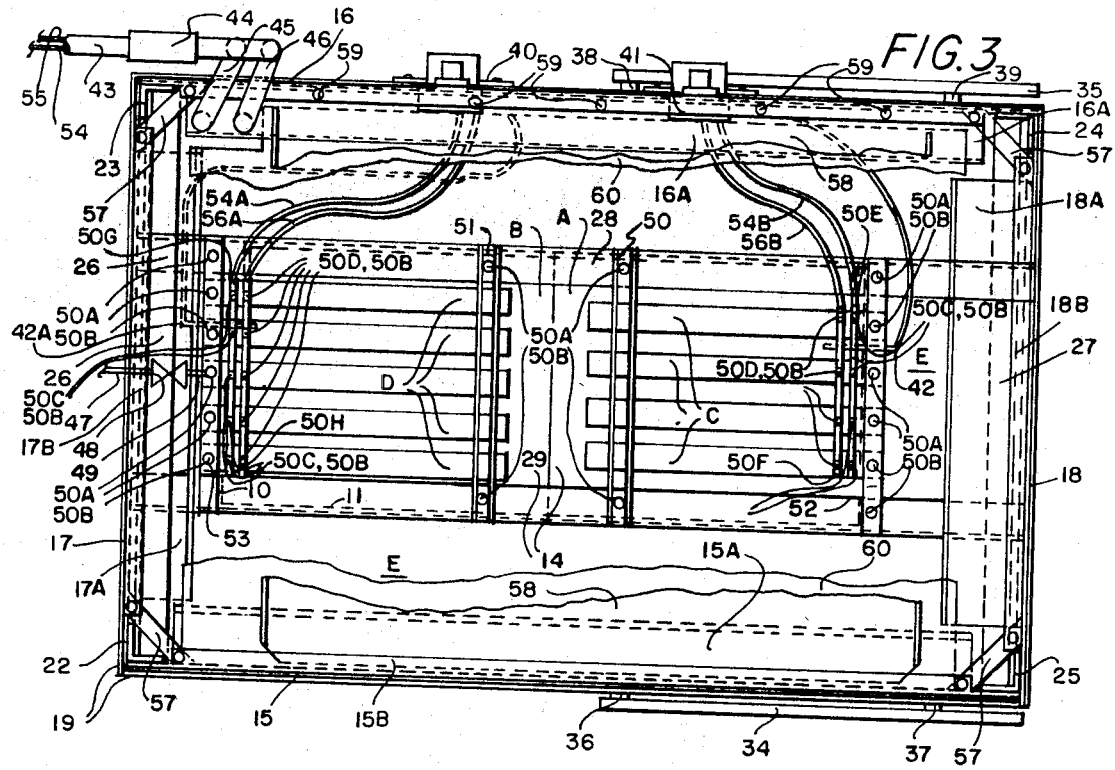
FIG. 3
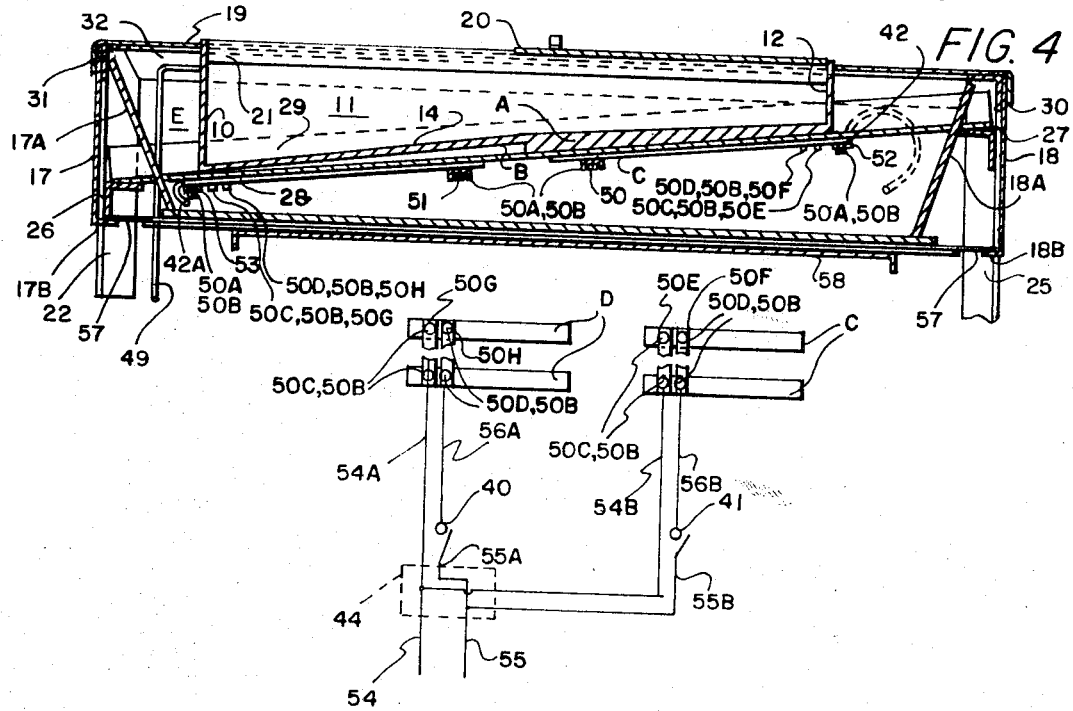
FIG. 4
FIG. 5
INVENTOR.
HELEN E. McEVOY
BY
Robert E Breichenthal
ATTORNEY

COMBINATION COOKER, FRYER AND BUN WARMER ELECTRICAL APPLIANCE

My invention relates to an improvement over my deceased husband's invention and patent on a combination cooker, fryer and bun warmer U.S. Pat. No. 1,991,906 issued Feb. 19, 1935.

The features of improvement are the changing of the gas heating means to an electrical heating means and also improving the structure of the heating compartment over the former patent plus the insulating features and a water supply to the cooking compartment and other improvements that will appear as this description progresses.

Now referring to the accompanying drawings in which similar numerals are referenced designate the same parts throughout the several figures of the drawings.

FIG. 1 is a plan view of the electrical appliance.

FIG. 2 is a side view of the electrical appliance.

FIG. 3 is the bottom view of the electrical appliance.

FIG. 4 is the detail cross-sectional view of the electrical appliance, the view being as seen from the line IV-IV in FIG. 1 and looking in direction of the arrows.

FIG. 5 is the wiring diagram of the electrical system employed in this electrical appliance.

In the drawings the electrical appliance is shown as having a cooking container which preferably is of cast iron and has four sidewalls 10, 11, 12 and 13, also, an inclined bottom 14, the higher end of the inclined bottom 14 is thicker (as at A.) than the lower portion (as at B).

The cooking container is housed in a sheet metal boxlike element, having two opposite side panels 15 and 16 and two opposite end panels 17 and 18, a top panel 19 having outside edges turned down as flanges to fit about the top edges of opposite side panels 15 and 16 and opposite end panels 17 and 18 and the turned down flanges of top panel 19 are rigidly fixed (welded) to the panels 15, 16, 17 and 18. The top panel 19 has a cut out that fits around the upper edge of the cooking container walls 10, 11, 12 and 13, and is provided with a trim angle 21 that fits around the cutout opening and its vertical leg fits within the cooking container walls 10, 11, 12 and 13 as a finish around the cutout of top panel 19.

The top panel 19 is further provided with a partial cover element 20 for the cooking container 10, 11, 12, 13 and 14, and, is slidable from one side to the other of the opening in panel 19. The inside surface of side panels 15 and 16 and end panels 17 and 18 are individually provided with an insulation covering 15A, 16A, 17A and 18A which is spaced away from the four sidewalls 10, 11, 12 and 13 of the cooking container.

The foregoing electrical appliance is supported on a frame structure comprising four angle iron members 22, 23, 24, and 25, one being positioned in each inside corner of the box element. The frame is further provided with a cross-frame member 26 extending between two legs 22 and 23 and a second crossmember 27 that extends between the other two leg members 22 and 23, all of which are rigidly fixed (welded) to their respective leg members 22, 23 and 24, 25, the crossmember 27 being elevated to a higher position than the crossmember 26 so as to match the bottom slope of the bottom of the cooking container 17.

The frame is further provided with a pair of longitudinal angle iron supports 28 and 29, the horizontal (in relation to the vertical) legs which extend beneath the cooking container 17 for support of the cooking container.

The vertical (in relation to the horizontal) legs of the pair of longitudinal angle iron supports 28 and 29 extend upwardly, one on each side of the cooking container. The ends of these angle irons 28 and 29 are supported and rigidly attached (welded) to their respective cross support angle irons 26 and 27. The frame is further provided with cross support angle irons 30 and 31 that are parallel with crossmembers 26 and 27 that fit in the upper corner of the box element to support the top panel 19 and also the side panels 15 and 16 and end panels 17 and 18 of the boxlike element.

The frame structure is further provided with two angle iron support members 32 and 33 that fit in the other two upper inside corners of the outer box element and the ends of the crossmembers 32 and 33 are rigidly attached (welded) to the upper ends of the support legs 22 and 23; 24 and 25.

The electrical appliance is further provided with two protective wood strips 34 and 35 located on the outside, top edge portion of each of the two side panels 15 and 16 as shown in FIG. 1 and FIG. 2. Each wood strip is separated from side panels 15 and 16 by metal discs spaces 36 and 37, 38 and 39. The wood strips and metal discs may be fastened to the side panels 15 and 16 with metal screws or bolts (not shown). These wood strips are to protect the operator of the electrical appliance from contacting the adjacent hot walls of the boxlike element.

The electrical appliance is further provided with a plurality of standard electrical strip heater assemblies C and D that are positioned below and in close proximity to the inclined bottom 14 of the cooking container, and each are controlled by standard, combination make and break switches 40 and 41 located on side panel 17 plus a thermostat adjustment for which the thermostat is to make or break the circuit, obviously, if desired either of the switches 40 or 41 can be a manually controlled switch and eliminate the thermostat if desired.

The oven switch and thermostat 40 is in control of the heater group D, and the standard oven switch and thermostat 41 is in control of heater group C.

The electrical appliance is further provided with temperature sensor bulbs 42 and 42A located at the bottom of the cooking container 14 with the heating groups C and D connected with their respective thermostats and standard oven switches 40 and 41 for control of the heater groups C and D.

In the drawings is shown a conduit pipe 43 terminating in the junction box 44 from which extend flexible conduit elements 45 and 46 that terminate at the switches 40 and 41 and in the conduit pipe 43 is the main feed wires 54 and 55 that extend into the junction box 44 wherein each wire 54 and 55 divides. The wire 54 extends as wires 54A and 54B and the wire 54A continues and connects with one terminal 50C of the heater group D, and the wire 54B continues and connects with the other terminal 50C of the heater group C. The feed wire 55 divides as wires 55A and 55B. The wire 55A connects to one side of switch 40 and the wire 55B connects to one side of switch 41. A third wire 56A connects between the other side of the switch 40 and the remaining terminal 50D of the strip heater of heating group D. Similarly a third wire 56B connects to the other side of the switch 41 and the remaining terminal 50D of the strip heater of heater group C.

As aforestated the heater group C and D are composed of a plurality of heater strips positioned side-by-side and each heater strip has a pair of electrical binding posts at one end thereof that are spaced apart and depend from their respective heater strip.

The electrical appliance is provided with two channel heater strips supports 50 and 51 that are spaced apart and are parallel with each other and are positioned substantially near the center at the bottom of the cooking container. These channels are supported at their ends by means of bolts 50A that pass through the longitudinal support angle irons 28 and 29 and also the ends of the support channels 50 and 51, and, the nuts 50B threaded in the bolts 50A so as to support the support channels 50 and 51 in a spaced position below the longitudinal support angle irons 28 and 29.

The electrical appliance is further provided with a pair of support straps 52 and 53 positioned one at either end of the cooking container bottom 14 and in a spaced position there below, and these support straps 52 and 53 are supported at their ends by means of bolts 50A that pass through the horizontal legs of the longitudinal support angle irons 28 and 29, and also the support straps 52 and 53, and nuts 50B threaded on the bolts 50A support the straps 52 and 53.

The group of strip heaters C is supported at one end on the channel 50 and the other end by the strap 52, and the ends resting on the channel 50 are held loosely between the channel 50 and the cooking container bottom 14. The other ends of the strip heaters C rest on the support strap 52 and are rigidly held in position by bolts 50A that pass through the end of each strip heater and the support strap 52 on which the end of the strip heater is supported.

Similarly, the ends of the strip heaters of the group D are loosely positioned in the space between the channel 51 and the cooking container bottom 14, and the other ends of the strip heaters in group D rest on the support strap 53 and are rigidly bound thereto by bolts 50A that pass through the ends of strip heaters and the support strap 53 and nuts 50B are threaded on the bolts 50A.

Each of the strip heaters in group C and D is provided with a pair of depending electrical binding posts 50C and 50D that are equally spaced apart and are aligned each with the other. The group C is provided with a pair of electrical bus bars 50E and 50F. The electrical bus bar 50E is provided with holes that are aligned to receive one binding post of each strip heater in the group C, and the second bus bar 50F is also provided with holes to receive the second binding post of each strip heater in the group C and, nuts are threaded on all the binding posts of group C to secure a positive electrical connection between the bus bar and each binding post.

Each of the strip heaters in the group D is provided with a pair of electrical bus bars 50G and 50H. The electrical bus bar 50G is provided with holes that are aligned to receive one binding post of each strip heater in the group D and the second bus bar 50H is also provided with holes to receive the second binding post of each strip heater in the group D, and nuts are threaded on all the binding posts of group D to secure a positive electrical connection between the bus bar and each binding post.

The electrical appliance is further provided with a water supply pipe 47 in which there is a control valve 48, and from the control valve the water supply pipe 49 extends upwardly and passes through the upward edge portion of the cooking container sidewall 10 and terminates flush with the inner surface of the sidewall 10.

In building the foregoing-described electrical appliance the panel walls 15, 16, 17 and 18 and their insulation covering 15A, 16A, 17A, and 18A are spaced away from the cooking container walls 10, 11, 12 and 13 so as to provide a space E around the cooking container. In addition the four panel walls 15, 16, 17 and 18 are turned inward as flanges at their lower edges 15B, 16B, 17B and 18B as shown in FIGS. 3 and 4. The end portion of each flange 15B, 16B, 17B and 18B are cut away to make room for the angle iron legs to sit and bear against the inner surface of their respective side and end walls of the panels 15, 16, 17 and 18. In each corner formed by a side and end panel is a support strap 57, the ends of which are cut at an angle so that the angular ends of the support strap fit against the panel walls and rest upon the end portion of the flanges of the side and end walls and are fastened in place by any suitable method (such as screws, bolts or welding).

The electrical appliance is further provided with a bottom panel 58 that is shorter than the sidewalls 15 and 16. One edge of the bottom panel is supported on the upper surface of flange 15B. The opposite edge of the bottom panel bears against the lower surface of flange 16B and is secured in position by metal screws 59 that pass through the edge portion of the bottom panel 58 and through the inwardly turned flange 15B. The shorter opposite edges of the bottom panel are turned downwardly to lend structural strength to the bottom panel where there is no support for the bottom panel. The flanges on the bottom panel are trimmed away at one end to allow for fit upon the top surface of flange 15A.

The electrical appliance is further provided with a nonflammable insulating material 60 that is interposed between the bottom panel 58 and the strip heaters in groups C and D.

To summarize the foregoing description the electrical appliance is for making sandwiches and comprises principally a cooker container having a sloping bottom that is electrically heated by controlled electric means that is adjustable for any desired degree of heat and is provided with a valve-controlled water supply for a continuous process of cooking meat and making sandwiches.

To use the electrical appliance, the operator would open the water valve 48 and fill the container with the desired amount of water which of course would be in the lower portion of the cooker, whereupon the prepared meat, such as shredded, ground or chopped meat would be placed in the water in the cooker and both electric switches would be closed, and the thermostats adjusted to heat the water and fryer plate which is the upper portion of the sloping bottom 14 to a predetermined temperature and left to heat the water in the cooker to a predetermined temperature for cooking the meat, and, in this lower portion of the cooker the cooked meat is held until it is ready to be used. Now, to make a sandwich, a selected portion of the broiled meat is scraped up onto the elevated portion of the sloping bottom 14 where the liquid in the meat will drain back into the lower portion of the cooker, and, if desired, that portion of the meat may be pressed to squeeze still more liquid out of the meat and leave a comparatively more dry portion of meat, and may then be left on the upper portion of the bottom to fry to any desired degree. During this operation, one or more buns may be sliced in half, and may be placed on the top panel 19 around the opening of the cooker, and while there, heat will radiate through the walls of the cooker and heat the space E around the cooker and also heat the top panel 19, and, the split buns having been placed on the top panel 19 will absorb heat from the top panel 19, whereupon the halves of the warm bun may be turned face up and the fried patty of meat on the cooker bottom 14 may be placed between the two halves of a bun and be served as a hot sandwich.

Now while the foregoing description is that of what is probably the preferred form of the electrical appliance, it is to be understood that such modifications of the electrical appliance may be employed as lie within the scope of the appended claims without departing from the spirit and intention of the invention.

Now, having fully shown and described my invention, what I claim is:

1. Electrical food preparation apparatus comprising a rectangular housing having an interior and including a bottom wall, a sidewall and a top wall having an edge corresponding to the sidewall, said top wall having a rectangular opening therein that is in part bounded by an edge that is parallel to and spaced from said edge of the top wall to define a top wall portion therebetween for the warming of buns thereupon, an open-topped cooking container disposed in the interior of the housing, said container having its open top coincident with the rectangular opening and also having an upper peripheral edge that mates throughout its peripheral extent with the top wall about the opening in the latter, said container and the top wall of the housing being so constructed and arranged to close the top of the housing and to prevent communication of the interior through the top of the housing, said container including an inclined bottom wall that includes relative upper and lower portions, said bottom wall of the container being spaced above the bottom wall of the housing to define a first airspace therebetween, said container including a sidewall that is spaced from the sidewall of the housing to define a second airspace therebetween that is directly below said portion of the top wall and which extends above and is in free communication with the first airspace, a first and generally planar form of electric heating means in the first airspace and disposed directly below and in substantial parallelism to the lower portion of the bottom wall of the container, a first thermostatically controlled electric switch means for controlling the supply of electrical energy to the first heater means, a second and generally planar form of electric heating means in the first airspace and disposed directly below and in substantial parallelism to the upper portion of the bottom wall of the container, a second thermostatically controlled electric switch means for controlling the supply of electrical energy to the second heater means, valve controlled means for introducing water into the container, and a movable cover means partially closing the open top of the container.

2. The combination of claim 1, including means for reducing the transfer of heat energy from said spaces to the bottom and sidewalls of the housing, and means secured in spaced relation to a portion of the exterior of the housing for preventing inadvertent contact with such portion of the housing by operating personnel.

3. The combination of claim 1, wherein the upper portion of the bottom wall of the container is relatively thick with respect to and of relatively lesser inclination than the lower portion of the bottom wall of the container.

4. The combination of claim 1, wherein the first and the second electric heater means are disposed in the upper part of and thermally exposed to the first airspace.

5. The combination of claim 1, including means for reducing the transfer of heat energy from said spaces to the bottom and sidewalls of the housing, means secured in spaced relation to a portion of the exterior of the housing for preventing inadvertent contact with such portion of the housing by operating personnel, said upper portion of the bottom wall of the container being relatively thick with respect to and of relatively lesser inclination than the lower portion of the bottom wall of the container, and said first and said second electric heater means being disposed in the upper part of and thermally exposed to the first airspace.